United States Patent [19]
Hoffmann et al.

[11] Patent Number: 5,376,166
[45] Date of Patent: Dec. 27, 1994

[54] APPARATUS AND METHOD FOR DEFUSING AND SCRUBBING AIR STREAMS

[75] Inventors: Craig O. Hoffmann, Prior Lake, Minn.; David W. Waldron, Jr., Valdosta, Ga.

[73] Assignee: Lowndes Engineering Co., Inc., Valdosta, Ga.

[21] Appl. No.: 107,278

[22] Filed: Aug. 16, 1993

[51] Int. Cl.$^5$ .............................................. B01F 3/04
[52] U.S. Cl. .................................... 95/216; 95/219; 261/23.1; 261/17; 261/DIG. 9; 261/79.2
[58] Field of Search ................ 261/23.1, 17, DIG. 9, 261/79.2; 95/216, 219

[56] References Cited

U.S. PATENT DOCUMENTS

| | | | |
|---|---|---|---|
| 862,508 | 8/1907 | Ralston | 261/117 |
| 2,315,226 | 3/1943 | Rohlin | 261/DIG. 10 |
| 2,436,038 | 2/1948 | Farrell | 261/DIG. 9 |
| 3,702,306 | 11/1972 | Waldron | 252/305 |
| 3,841,063 | 10/1974 | Absher et al. | 261/DIG. 9 |
| 3,894,853 | 7/1975 | Pike | 261/23.1 |
| 3,972,697 | 8/1976 | Short, Jr. | 261/DIG. 9 |
| 4,257,792 | 3/1981 | Cremo | 261/DIG. 9 |
| 4,392,875 | 7/1983 | Celis | 261/DIG. 9 |
| 4,483,805 | 11/1984 | Glindsjo | 261/DIG. 9 |
| 4,529,421 | 7/1985 | Parma | 261/DIG. 9 |
| 4,992,206 | 2/1991 | Waldron | 252/305 |
| 5,176,325 | 1/1993 | Yidusek | 261/DIG. 9 |

Primary Examiner—Tim Miles
Attorney, Agent, or Firm—Hopkins & Thomas

[57] ABSTRACT

A smoke stack, which discharges contaminated gases, is provided with a plenum chamber, at its end, formed of one or more stacked modules. Each module includes a hollow cylindrical housing, from which protrudes, in various radial directions, a plurality of ducts, each being provided with a nozzle at its end. The nozzle has a central passageway through which a portion of the gases pass and is discharged into the atmosphere, and a second passageway which directs the air around the discharging gases for imparting a swirling action to the commingled gases. An ultra low volume of treatment fluid, usually a liquid chemical, is progressively discharged into the central passageway so that fog is generated as the gases and liquid emerge. Relief valves for the gas discharge into this fog. An accumulator tank at the top of a chamber or a metering pump supplies the liquid.

In the process, the stream of contaminated air is subdivided by the ducts and again subdivided by the nozzles, the liquid being fed to the central passageway of the nozzle through which a subdivided portion of air passes. Another subdivided portion of the air causes the mixture emerging from the passageway to swirl. Various treatment liquids are discussed.

25 Claims, 6 Drawing Sheets

FIG 3

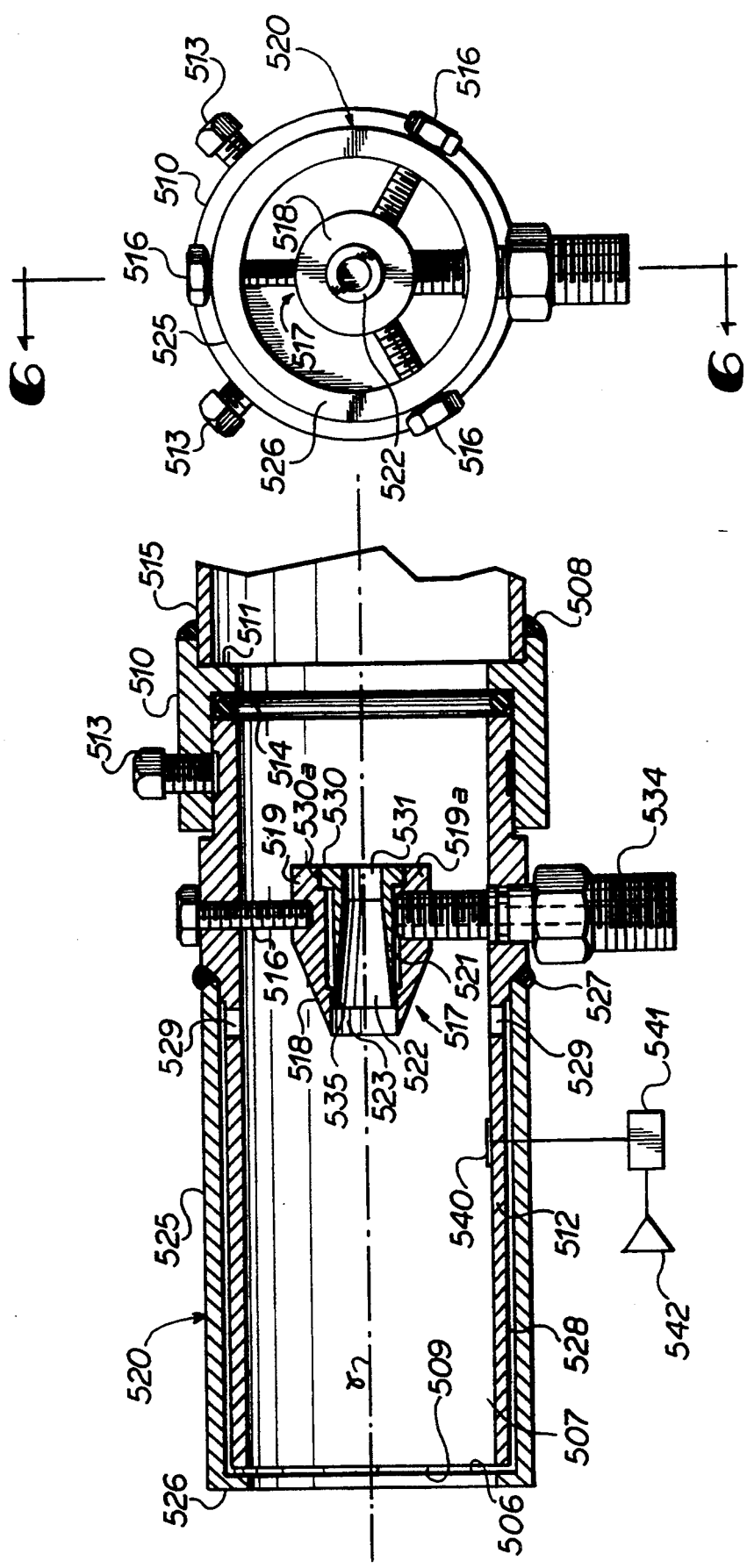

APPARATUS AND METHOD FOR DEFUSING AND SCRUBBING AIR STREAMS

FIELD OF INVENTION

This invention relates to an apparatus and method for treating contaminated air and is more particularly concerned with an apparatus and method for treating air which contains toxic chemicals and odorous gases, or dust.

DISCUSSION OF THE PRIOR ART

In the past, all air scrubbing systems have not had the ability properly to treat and disburse air. Typical scrubbing systems are either pack towers where the air is distributed through a wetted media with high surface area, or misting towers, where the air is passed through a mist of chemicals or beds of activated carbon in which the air is passed through the bed so that the carbon absorbs the contaminants of the air stream. In some cases, these scrubbers were used in conjunction with nozzles. Where nozzles alone were used, the liquid was introduced through the nozzles into a large stream of contaminated air, thereby providing ribbon affects which left only a portion of the air in a treated condition.

Still other methods of scrubbing included bubbling the air through liquid so that there was some absorption of the contaminants into the liquid. However, the air trapped in the bubbles remained essentially untreated; therefore, this system was relatively ineffective. Dust in air streams was usually treated using water to wash out the air stream as it passes along a prescribed path. Such washing is usually fairly expensive and did not completely remove the dust from the air.

Still other forms of scrubbing, scavenging, washing, and reacting the contaminated air with chemical compounds exist.

The present invention seeks to overcome the disadvantages of the prior art contaminated air treatment devices and methods by providing an inexpensive yet quite efficient process by which the contaminated air is so thoroughly mixed with the liquid with which it is treated that a number of uniform fog streams are generated which are released in several directions to the atmosphere as a plurality of diverging swirling fog streams. The vortexes producing each fog stream cause the liquid, which is initially entrained in the central or primary stream of air, to be thrown outwardly into the secondary air and thereby thoroughly mixed with substantially all of the contaminated air and liquid, essentially uniformly.

SUMMARY OF THE INVENTION

Briefly described, the apparatus of the present invention includes one or a plurality of modules which include one or more modules having hollow tubular housings disposed over a main duct such as an open chimney or stack. Where more than one module is used, the housings are arranged in tandem, with one housing over the next so as to form an extension of the chimney or stack. Each hollow tubular housing is substantially identical to the other, being preferably a cylindrical member having latching elements such as flanges at its opposite ends. A plurality of axially spaced and circumferentially spaced ports are provided in the sides of each of the housings, each port being circumscribed by a fixed sleeve which is internally threaded. Certain of the internally threaded sleeves receive the proximal ends of ducts, the distal ends of which are capped by aerosol nozzles, and then discharged into the atmosphere.

In certain embodiments, the uppermost housing is provided with a cap which contains an accumulator tank or gravity tank to which is supplied a premixed formulation of the liquid treatment chemicals. These chemicals are supplied from a supply tank by a metering pump to the accumulator tank.

Communications with a pair of nozzles from the lower portions of the accumulator tank are a plurality of supply conduits or tubes through which the liquid is supplied by gravity from the accumulator tank to the respective nozzles. Each supply line or tube is provided with a needle valve, by which the amount of liquid to be delivered is preset. Over and spaced from each nozzle is an individual air relief valve which communicates with the housing and, when actuated, discharges the contaminated air into the stream of air which emerges from its nozzle.

Each nozzle is constructed so that a primary portion of the air is directed through a central passageway in the nozzle and the liquid is supplied radially inwardly into the central primary air stream, so as to be admixed with it, forming ultra small droplets thoroughly mixed with the air as the air emerges axially from the center of the nozzle. Certain nozzles have channels for directing the remaining or secondary air around the central passage and then tangentially toward the emerging central stream to impart a swirling action to both the primary and secondary air.

Other embodiments of the invention include conduits for supplying the liquid directly to the nozzles and other configurations for disposing the nozzles circumferentially around the housing. The liquid supplied to the nozzles is suitable for reacting, scrubbing, deodorizing or otherwise decontaminating the treated air. Usually, the admixed liquid and air emerge from each nozzle as a fog.

Noise abatement optionally can be used in connection with the nozzles to reduce the noise caused by the nozzles.

Accordingly, it is an object of the present invention to provide a method and apparatus for treating contaminated air which apparatus is inexpensive to manufacture, durable in structure and efficient in operation and the method carried out by the apparatus thoroughly commingles treatment fluid with the contaminated air so as to discharged it into the atmosphere as a detoxified, reacted or deodorized air.

Another object of the present invention is to provide an apparatus for treating contaminated air, treat it in a subdivided condition with fluids so as thoroughly to subdivide the air and discharge it in a plurality of directions simultaneously thereby dispersing the treated air with small increments of the fluid contained therein.

Another object of the present invention is to provide an apparatus for treating stack gases with treatment chemicals which will assure uniform and intimate contact of the chemicals with the gases, for thoroughly admixing the two together as the stack gases are discharged to the atmosphere.

Anther object of the present invention to provide an apparatus and method for treating toxic and odorous gases with treatment chemicals, which apparatus and method will allow visual observation of the treatment as it is carried out.

Another object of the present invention is to provide a process for intermixing toxic and/or odorous gases with treatment liquids in which the treatment liquids are reduced to extremely small particles which are uniformly intermixed with the gases, providing more surface area for the absorption of the chemicals.

Another object of the present invention is to provide an apparatus and process for treatment of air streams which will more thoroughly and rapidly treat large volumes of air with minute quantities of liquids.

Another object of the present invention is to provide an apparatus and process for the treatment of stack gases, which reduces to a minimum the cost of treating such stack gases.

Another object of the present invention is to provide an apparatus for treating stack gases which can be installed on existing equipment and which can be both installed and operated at relatively low cost.

Another object of the present invention is to provide an apparatus for the treatment of stack gases which apparatus can be readily and easily installed, removed and increased in capacity as the need for treatment of the gases varies.

Another object of the present invention is to provide an apparatus and method of treating stack gases which will readily and easily meet the standards currently in effect for deodorizing and detoxifying of gases.

Another object of the present invention is to provide an apparatus for treating emerging stack gases, which apparatus is suitable for using a variety of different chemicals which detoxify, neutralize, deodorize, scrub or scavenge the emerging gases.

Another object of the present invention is to provide an apparatus and method for treating a stream of gases in which the amount of liquid employed to treat the gas can be readily and easily regulated and admixed with the gases, even though relatively small amounts of the liquid are to be used.

Another object of the present invention is to provide an inexpensive apparatus for mixing liquid with a flow of contaminated air or gases in an efficient manner which is essentially free of complicated equipment which cannot be readily serviced.

Another object of the present invention is to provide a system and apparatus for treating stack gases which will cause no appreciable condensation within the stack or the pipelines.

Another object of the present invention is to provide an apparatus and process for treating toxic or odorous gases in which there is appreciably no danger of an explosion and requires no electrical parts in close proximity to the emerging gases.

Another object of the present invention is to provide a system and apparatus for the static admixing of treatment chemicals and stack gases utilizing a static mixing system at the point of discharge of the stack gases.

Another object of the present invention is to provide an apparatus and process of treating stack gases with treatment chemicals at a point in which the temperature of the stack gases is at a minimum.

Another object of the present invention is to provide a system and apparatus for treating stack gases which will employ quite diluted treatment compounds to thereby obtain better results at less costs.

Another object of the present invention is to provide a system and method of treating a stream of air and gases with fluids which can be readily and easily changed from one treatment to another without appreciably altering the apparatus or method.

Another object of the present invention is to provide an apparatus for treating stack gases wherein units of the apparatus can be individually calibrated and adjusted and also evaluated as to their distribution characteristics and efficiency.

Another object of the present invention is to provide an apparatus for treating contaminated air with a fluid which apparatus is modules in construction, having a few number of parts, interchanged with each other, and essentially no moving parts.

Other objects, features and advantages of the present invention become apparent from the following description when considered in conjunction with the accompanying drawings wherein like characters of reference designate corresponding parts throughout several views.

BRIEF DESCRIPTION OF THE DRAWINGS

Figure 3:
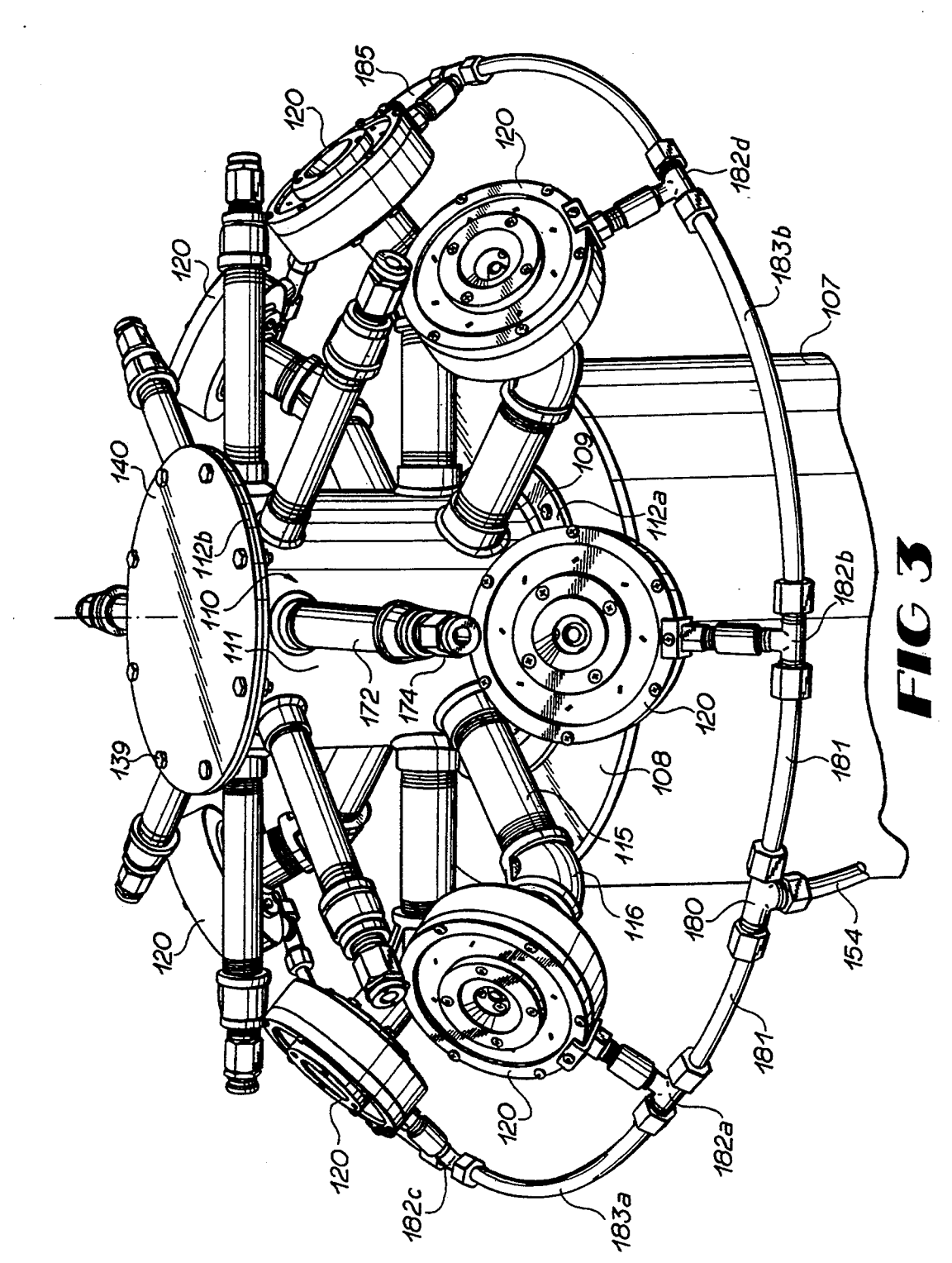

FIG. 3 is a perspective view of a modified form of the apparatus depicted in FIG. 1, the apparatus being attached to the top of a smoke stack;

FIG. 6 is a cross-sectional view taken substantially along line 6—6 in FIG. 7 and containing a noise abatement circuit shown schematically; and FIG. 7 is a front elevational view of a modified form of a nozzle which can be substituted for the nozzles of the embodiments of the preceding figures.

DETAILED DESCRIPTION OF THE PREFERRED EMBODIMENT

Figure 1:
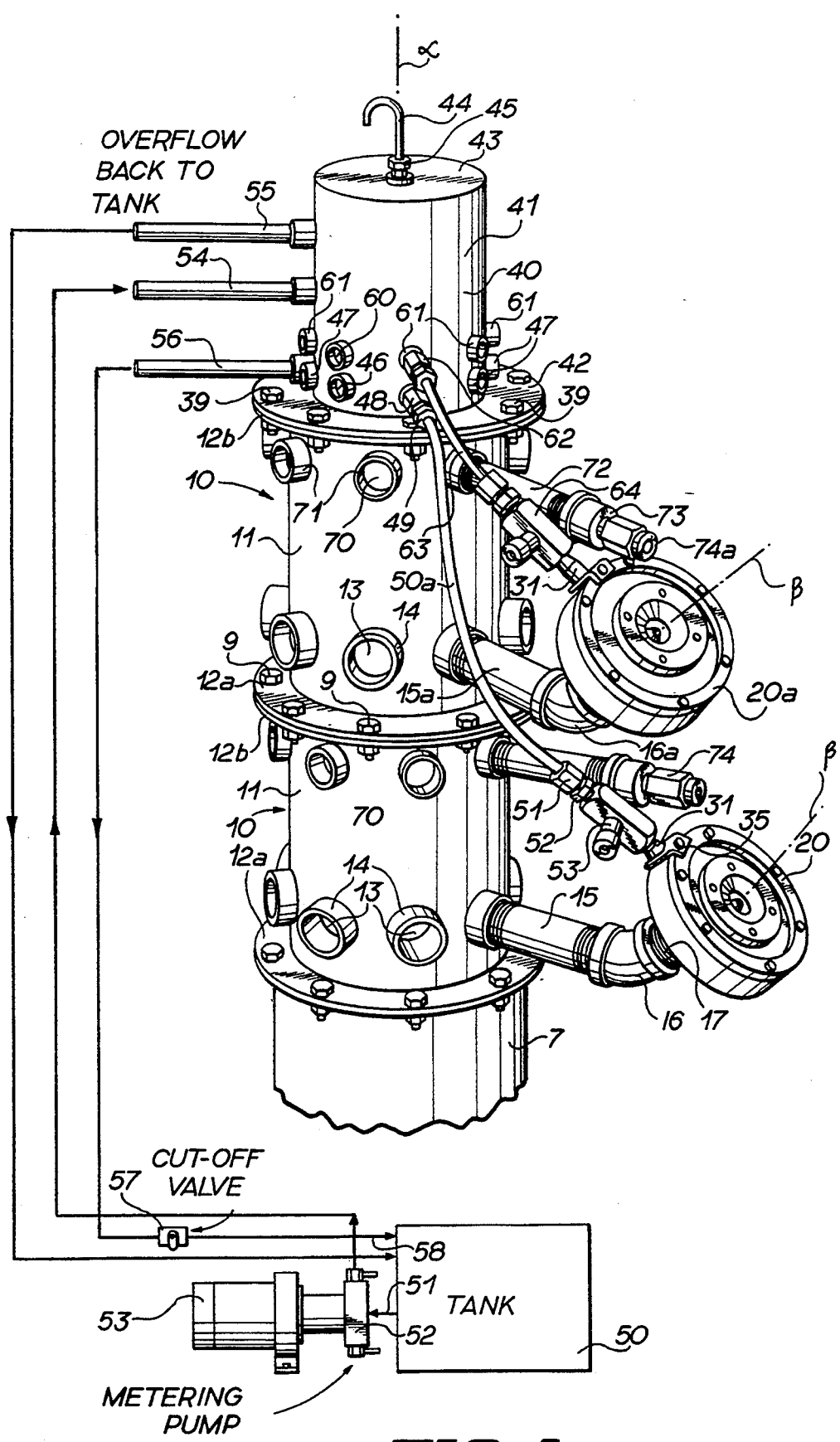
FIG. 1 is a perspective view of an apparatus for treating gases with treatment liquids, constructed in accordance with the present invention, certain of the nozzle assemblies thereof being removed for clarity and a portion of the liquid supply being illustrated schematically.

Referring now in detail to the embodiments chosen for purpose of illustrating the present invention, numeral 10 denotes generally one of the contaminated air scrubbing modules which is capable of being arranged in tandem with other similar modules into a module assembly, defining a plenum chamber mounted at the discharge end of an upstanding main duct or stack 7. Each treatment module 10 includes a hollow, cylindrical tubular housing or casing 11 which is open at both ends. The ends of the housing 11 are provided with outwardly protruding annular, butt flanges 12a and 12b.

In FIG. 1, two modules 10 are shown stacked one on top of the other and arranged concentrically along a vertical axis a, the upper butt flange 12b of the lower housing 11 being secured flat against the lower butt flange 12a of the upper housing 11 by bolts 9.

Between the flanges 12a and 12b, each housing 11 is provided with a plurality of circumferentially equally spaced gas discharge ports 13, disposed about 45° apart so that there are usually approximately 8 ports 13 in each housing 11. Each discharge port 13 is surrounded by an internally threaded collar or fitting 14 secured to the housing 11. Each collar 14 receives and supports a nozzle assembly which includes a horizontal radially extending nozzle supporting duct 15 threaded at both ends, the proximal end being threadedly received in the collar 14 and the distal end threaded receiving a 45° elbow 16. The elbow 16 in turn receives a short inclined tube or duct 17 which, forms a part of a nozzle, denoted generally by numeral 20, seen in FIG. 2.

Figure 2:
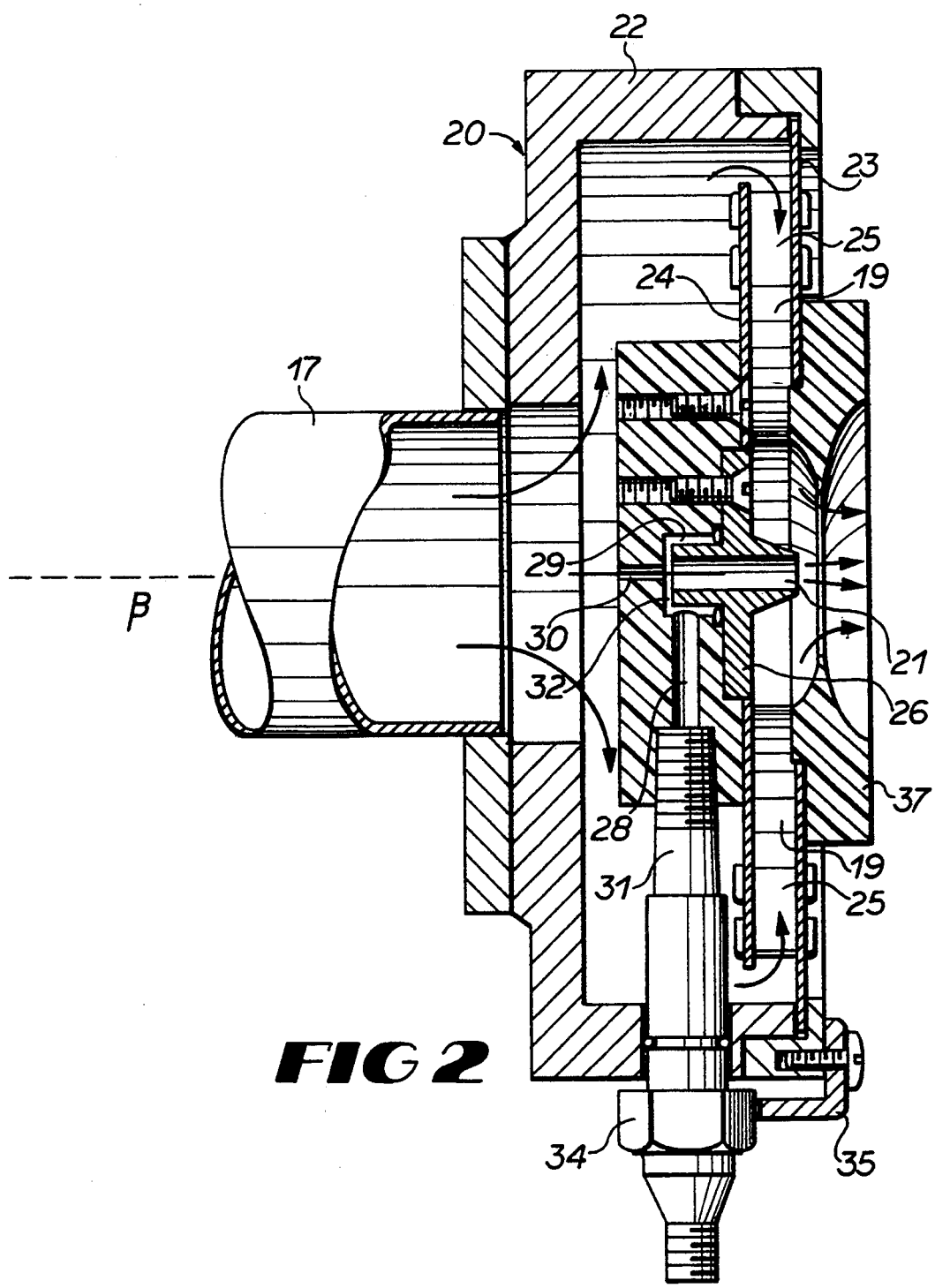
FIG. 2 is a vertical sectional view of one of the nozzles depicted in FIG. 1.

The nozzles 20 are each ultra low volume (ULV) cold aerosol nozzles of a type which is shown in various Waldron patents such as Waldron U.S. Pat. No. 3,702,306 issued November 1972 and also Waldron U.S. Pat. No. 4,992,206 issued Feb. 12, 1991. Characteristic of these Waldron nozzles and indeed, characteristic of the nozzle 20 depicted in FIG. 2, is that the air fed axially to the nozzle is subdivided so that a primary portion of the air passes through a central cylindrical passageway 21 along axis $\beta$ and the remainder or secondary portion of the air passes around the axial passageway and inwardly through radially spaced passageways 19 as shown by arrows in FIG. 2. The nozzle 20 is a product of Lowndes Engineering Company, Inc. of Valdosta, Ga. Hence, only a brief description of the construction and operation of this nozzle 20 is deemed to be necessary.

In more detail, the nozzle 20, shown best in FIG. 2, has a cup-shaped circular housing 22 which is disposed coaxially about axis $\beta$ on the end of the tube or duct 17. This housing 22 carries an annular front plate 23 and a centrally located back plate 24, there being provided between the front plate 23 and the back plate 24 a plurality of inwardly directed arcuate vanes 25 as shown more fully in the Waldron U.S. Pat. No. 3,702,306, which define secondary passageways or channels which respectively direct the secondary air portion of the air radially inwardly to impinge upon and impart a swirling motion to the primary air emerging from the central straight axial passageway 21 of a nozzle member 26.

The nozzle member 26 is rearwardly of and concentrically with an annular face plate 37, the outer periphery of which is carried by the inner periphery of front plate 23. The nozzle member 26 is supported by a central block 27. The central block 27, in turn, is supported by the inner plate 24 and has a fluid channel 28 through which the treatment liquid is introduced into an annular liquid reservoir 29 surrounding passageway 21. A liquid supply pipe 31 communicates with channel 28 and has a hexagonal head 34 by which pipe 31 is rotated so that its threads engage the internal threads at its inner end of the inner housing 27. A keeper plate 35 straddles the hexagonal 34 so as to lock the supply pipe 31 in place, as illustrated in FIG. 2. A needle valve 53 is threadedly received by threads 36 on the external end of the supply pipe 31.

Liquid, supplied by pipe 31 passes, via channel 28, inward around the annual reservoirs 29 and is forced radially inwardly toward the central axis $\beta$ of the nozzle 20 through the thin annular opening 32 between block 27 and nozzle member 26. The liquid is then swept along the wall of passageway 21 and air passing through a central hole 30 aligned with passageway 21 thus entrains this liquid by sheering it as the liquid emerges radially inwardly and progressively is moved along the inside surface of the passageway 21 by the air and the liquid is further sheered, as it emerges from passageway 21, by the inwardly directed secondary air which tangentially emerges from passageways 19 and engages the stream of primary air and liquid to impart, a swirling motion directed by the vanes 25. Hence, a thoroughly commingled mixture of liquid and air emerges along axis $\beta$ as a fog in a vortex from the mouth of front plate 37.

It will be understood by those skilled in the art that ultra low volumes of liquid can thus be quite accurately progressively delivered to and admixed with a large volume of air emerging progressively from the nozzle 20. The air and liquid is so thoroughly mixed that it emerges as a fog or aerosol from nozzle 20, the liquid being uniformly dispersed in the air and having an average partial size of between about 5 microns and about 50 microns.

As shown in FIG. 1, the uppermost housing 11, be it simply a single housing 11 or the topmost of a large number of stacked or tandem arranged housings 11, is provided with an accumulator or gravity tank assembly 40 mounted on this uppermost housing 11. This accumulatory tank assembly 40 has an accumulator or gravity tank 41 which is closed at its bottom portion by a bottom plate 42 and closed at its top portion by top plate 43. The bottom plate 42 is circular and protrudes radially outwardly beyond tank 41, being of a diameter equal to approximately the diameter of flange 12b. This bottom plate 42 is concentrically received on the flange 12b of the uppermost housing 11 and the outer peripheral portion of the bottom plate 42 is bolted by means of bolts 39 to the flange 12b of the uppermost housing 11.

The top plate 43 is provided with a normally open upstanding breather and overflow breather tube 44. Tube 44 enables the tank 41 to be filled without building up air pressure in the tank 41 and also provides an overflow, in the event that the tank 41 is overfilled. The distal end portion of tube 44 is inverted and U-shaped and the proximal end portion extends downwardly to terminal in a fitting 45 which is threadedly received in the central top portion of top plate 43. Thus, tube 44 permits air to enter the tank 41 and be exhausted from the tank 41 as the liquid is either supplied to the tank or withdrawn from the tank 41.

In FIG. 1, a storage tank 50 is depicted schematically, the storage tank 50 is substantially larger than tank 41 so that it may supply several tanks, such as tank 40. Tank 50 has a discharge pipe 51 which leads to the suction side of a metering pump 52. A motor 53 drives the metering pump 52 for discharging the liquid treatment chemicals into a supply line or conduit 54. This supply line 54 discharges into a central portion of the accumulator tank 41 through an appropriate port in the side of tank 41.

Above the discharge end of the line 54, is a second overflow pipe or tube 55 which communicates with the upper portion of tank 41 below the overflow/breather tube 44. This overflow tube or pipe 55 leads back into the tank 50 so that any excess liquid which is pumped up to accumulator tank 41 is returned to the storage tank 50. At the bottom portion of tank 41 is a drain pipe 56 provided with a cut-off valve 57 which, in turn, is connected to a return line or tube 58, leading to the storage tank 50. When the cut-off valve 57 is opened, substantially all the liquid in accumulator tank 41 will be returned to the storage and 50 by gravity.

Adjacent to the bottom plate 42, the cylindrical tank 41 is provided with a plurality of circumferentially equally spaced discharge ports 46, each of which is surrounded by an internally threaded collar 47. Each of the collars 46 threadedly receives a coupling, such as coupling 48 seen in FIG. 1, this coupling, in turn receiving a cap 49 which connects one end of a supply tube 50a to the coupling 48. The other end of the tube 50a is provided with a second cap 51 connected to a coupling 52 which, in turn, is threadedly received in one end of a pressure needle valve 53.

The pressure needle valve 53, in turn, is connected to a threaded end of a liquid supply pipe, such as pipe 31 seen in FIG. 2. Thus, when liquid is supplied to the tank 41, it will flow by gravity into the nozzles 20 and thence be entrained in the primary air passing centrally through the passageway 21 of the nozzle 20 and then can be further intermixed with the swirling secondary air introduced by veins 25, the mixture thence passing out into the atmosphere. Hence, all of the contaminated air or gases passing through a pipe 15 and thence into the nozzle 20, is thoroughly commingled with the swirling air emerging from the nozzle 20 so that droplets of the treatment liquid are disbursed progressively into the emerging air for generating a fog in which the droplets of the treatment liquid have a particle size of 5 microns and about 50 microns.

The tubes 50*a*, which lead from the lowermost discharge ports 46, are connected to the lowermost nozzles 20 which are circumferentially spaced around the periphery of the housing 11 and inclined at about 45° to the horizontal.

Above the ports 46 are a second group of circumferentially equally spaced upper discharge ports 60, each having a collar 61 surrounding the port 60. The discharge ports 46 are spaced circumferentially approximately 45° from each other so that there are generally about 8 ports around the lowermost portion of the tank 41. In like fashion, the upper ports 60, the axes of which are in a horizontal plane, respectively disposed immediately above the ports 46 are arranged approximately 45° from each other and vertically i.e., axially aligned with ports 46, respectively.

Each of the collars 61 receives an appropriate fitting 62 communicating with a tube 63, which in turn, communicates with a relief valve 64 connected to the supply pipe 31 of a nozzle 20*a*. Nozzle 20*a* is mounted an a 45° incline by an elbow 16*a* carried by a nozzle supporting duct 15*a* which protrudes horizontally from collar 14 of the uppermost housing 11. The difference between the supply duct 15*a* and the duct 15 is that the duct 15 is longer than the duct 15*a* so as to space the nozzle 20*a* radially inwardly toward the vertical axis $\alpha$ of the assembly 40, with respect to the nozzle 20. Hence, pairs of nozzles 20 and 20*a* discharge the mixture of air and liquid in progressively expanding cones along parallel axes $\beta$ at inclines of about 45° upwardly and outwardly.

At the upper peripheral portions of each housing 11 there are provided circumferentially spaced air discharge ports 70 which are respectively arranged above the ports 13 and circumferentially spaced from each other by about 45°. These ports 70 are circumscribed by collars 71 on the housing 11. Each collar 71 threadedly receives a horizontally outwardly extending, radially positioned conduit or duct 72 which is threaded at both ends, one end being threadedly received by the collar 71 and the other end being provided with a reducers 73 from which protrudes a relief valve such as valve 74 or 74*a*. The relief valves 74 and 74*a* are respectively disposed above each of the nozzles 20 and 20*a*, so that, in the event of an unusually high pressure of the gases, i.e., air, within the confines of the housings 11, the relief valves 74, 74*a* will be opened so as to respectively discharge the air or gases outwardly in radially horizontal directions, respectively above the upturned nozzles 20, 20*a*. Thus, should abnormally high pressure be generated within the stack 7 and within chamber of the housings 11, the air or gas will be bled off and commingle with the emerging vortexices of fog discharged from the nozzles 20 and 20*a*.

Each nozzle 20 or 20*a*, as the case may be, is thus provided with its own associated relief valve 74 or 74*a* so that any air, which is bled through the relief valves 74, 74*a*, almost immediately commingle with the vortex of fog emerging from the nozzle 20 or 20*a*. In any event, substantially all of the contaminated gases or air emerging through the relief valves 74, 74 will be subjected to swirling uniform amounts of minute particles of treatment liquid.

By arranging the upper tube 63 to be shorter than the tube 50, the pressure drop across the longer tube 50 will be greater than the pressure drop along the shorter tube 63 and the pressure head on the liquid which will travel through tube 50 is greater than the pressure head on the tube 63, the difference in the lengths of tubes will tend to equalize the amount of liquid delivered to the nozzles 20 and 20*a*, respectively, due to the throttling affect which will cause a pressure drop on the liquid in the longer tube. In any event, each nozzle 20 can be adjusted so as to deliver a prescribed amount of liquid by adjusting needle valve 53 or 72.

In FIG. 3, a modified form of the present invention is illustrated. The module 110 employed in this illustration is identical to the module 10 illustrated in FIG. 1. This module 110, briefly described, includes a housing 111 having ducts 115 which protrude radially from the lower portion of the housing 111. Each duct 115 is provided with a 45° elbow 116 so that it supports nozzles 120, the axes of which are at 45° so as to discharge their respective fogs upwardly and outwardly from the housing 111.

The relief valves 174 are disposed above and adjacent to the periphery of nozzles 120 so as to discharge air or gases, vented from the housing 111, into the fog stream emerging from its associated nozzle 120. Each of the relief valves 174 is supported by a tube or pipe 172 which protrudes from the upper portion of the housing 111. As in the embodiment of FIG. 1, these pipes 172 protrude radially outwardly and from the housing 111 and are arranged at about 45° from each other, the axes of these pipes 172 being disposed in a common horizontal radial plane above the common radial plane of the axes of pipes 115.

In the embodiment of FIG. 3, the housing 111 is provided with a flat disc shape or circular cap 140 secured by bolts 139 to the upper flange 112*b* of the housing 111. The lower flange 112*a* of the housing 111 is secured by bolts 109 to a flat annular plate 108 mounted on the upper end of a contaminated air discharge duct, smoke stack or chimney 107. This housing 111, therefore, receives the discharge of all stack gases from stack or chimney 107. Thence, these stack gases sub-divide to pass to the various nozzles 120 and are again subdivided by each nozzle 120, as described above.

For introducing liquid to the nozzles 120 so that this liquid is admixed with the emerging stack gases, a metering pump (not shown but identical to pump 53) delivers treatment liquids, via supply tube or pipe 154, to a tee connector 180. The liquid, delivered to the tee connector 180, feeds to a circular manifold 185 having tubes 181, tee connectors 181 182*a* and 182*b*, etc. Liquid is delivered in a circular path from tee connectors 182*a* and 182*b* via tubes 183*a* and 183*b* so as to pass through the loop of tubes and connectors forming manifold 185 and supply each nozzle 120. Manifold 185 thus supplies all of the nozzles 120 with treatment liquid so that each nozzle 120 has approximately the same amount of liquid being delivered for admixing with the emerging gases discharged from the nozzles 120. Any build-up of pressure within the stack 107 which is closed off by the housing 111 and plate 140 will, of course, be discharged through the relief valves 174 for admixture with the emerging fog from the respective nozzles 120.

The metering pump, (not shown) such as pump 53 can regulate the pressure in the closed loop manifold so as to control the amount of liquid being delivered to the nozzles 120. Needle valves, such as needle valve 53 or 72, control the amount of liquid delivered by each nozzle.

Figure 4:
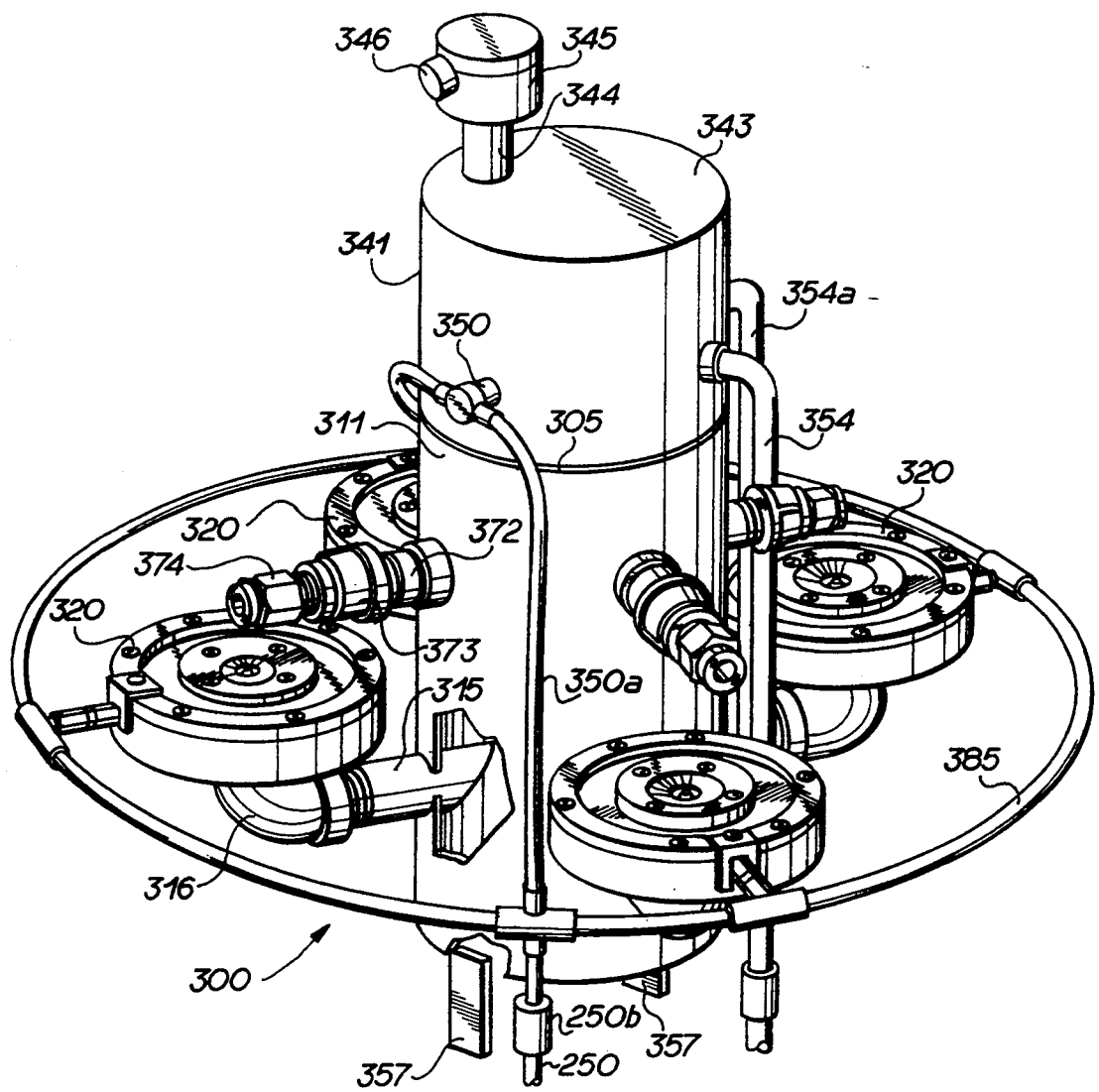
FIG. 4 is a perspective view of a portion of a modified form of the apparatus shown in FIG. 1.
Figure 5:
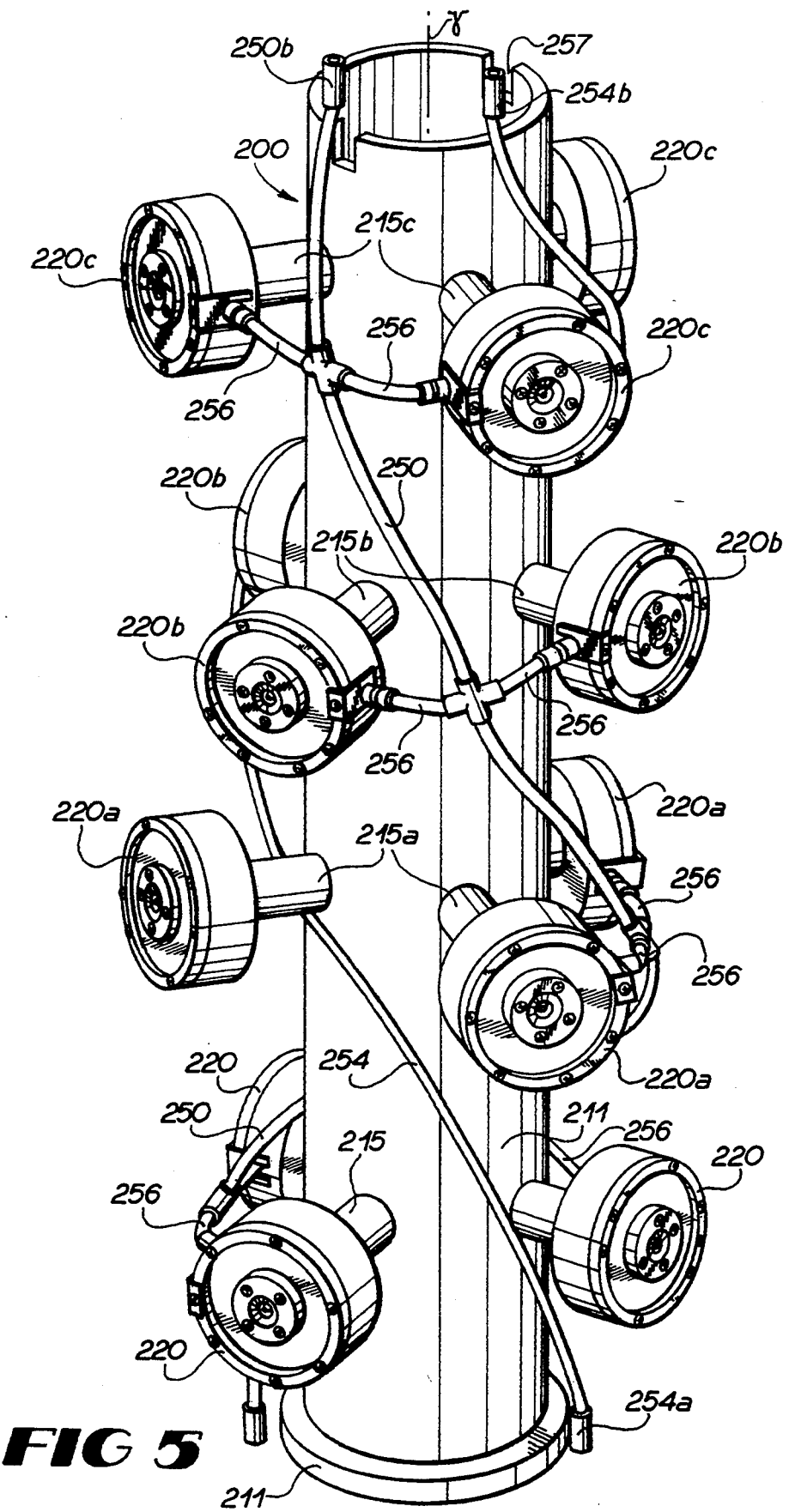
FIG. 5 is a perspective view of the other portion of the apparatus depicted in FIG. 4.

In FIGS. 4 and 5, still another embodiment of the present invention is disclosed. This embodiment is used preferably when the treatment formulation is to be premixed immediately prior to being delivered to the nozzles. In more detail, the structure shown in FIG. 5 includes a hollow tubular housing 211 which is elongated along its upright axis δ, the housing 221 preferable being mounted on the upper end of an air duct or smoke stack (not shown).

Protruding radially from a lower portion of the housing 211 are a plurality of circumferentially equally spaced lower nozzle support ducts 215. Each nozzle support duct 215 is provided at its distal end with a nozzle 220 which is identical to the nozzle 20. Each nozzle 220 is arranged coaxially with its support pipe 215 so as to direct the fog generated by the nozzle 220 horizontally radially outwardly. Above the ducts 215 a second group of circumferentially spaced radially protruding pipes, or ducts 215a, respectively support the outwardly facing nozzles 220a arranged so as to direct the fog from nozzles 220a in horizontal directions radiating outwardly. It will be seen in FIG. 5 that the ducts 215a are circumferentially staggered with respect to the ducts 215 so that the nozzles 220a direct the fog in a direction 45° circumferentially from the fog of nozzles 220.

Above the plane of the axis of the ducts 215a are a plurality of additional nozzles supporting ducts 215b which, likewise, are staggered with respect to the ducts 215a, thereby disposing the radially outwardly discharging nozzles 220b, which are supported by the ducts 215b, vertically above the nozzles 220. Above these group of ducts 215b are additional array of ducts 215c and then another array of duct 220c, also staggered with respect to the ducts 215b so as to dispose the nozzles 220c which they carry, above the nozzles 220a staggered with respect to the nozzles 220b, etc.

It will be understood that, while FIG. 5 illustrates horizontally directed nozzles arranged 90° from each other in each group of nozzles 220, 220a, 220b and 220c, any practical number of nozzles may be arranged in successive layers, and be pointed in any desired direction.

Helically wound around the housing 211 is a liquid supply tube or conduit 254 which is provided with a lower coupling 254a and an upper coupling 254b. Also, helically wound around the exterior of the housing 211 is a second supply tube or conduit 250 which feeds to appropriate branch supply tubes 256, and thence to adjacent pairs of nozzles 220c, 220b, 220a and 220, respectively, the supply tubes 256 extending generally horizontally toward the nozzles 220, other supply tubes (not shown) supply liquids to the remaining nozzles 220, 220a, 220b, and 220c.

It will be understood that two or more modules 200 as seen in FIG. 5 may be stacked one on top the other with the coupling 250b being connected to additional supply lines which run along the outer periphery of the next module.

In FIG. 5, the module 200 has a diametrically opposed notches 257 at its upper end to receive L-shaped brackets 357 seen in FIG. 4, as the housing 311, which carries these brackets 357, is slid over and slightly overlaps the upper end portion of housing 211. For this purpose the housing 311 is of a slightly larger diameter so that the inside diameter of the hollow cylindrical housing 311 is approximately equal to the outside diameter of the housing 211 and so as to permit a snug overlapping of the two elements when the housing 311 is installed on housing 211.

Carried by the upper end portion of the housing 311 of FIG. 4 is a mixing tank 341. The housing 311 and the mixing tank 340 are concentric and separated by a metal plate partition 305. The mixing tank 341 is a hollow cylindrical member having a flat top 343 which closes the upper portion of the tank 341. An upstanding overflow pipe 344 and an overflow reservoir 345 is provided on top 343 communicating with the top of the chamber of tank 341. If the reservoir is overfilled, a valve in reservoir 345 is opened to let liquid spill out through the spout 346.

Coupled by coupling 254b to supply tube 254 is a supply tube 354 which leads to one side of the tank 341 so as to introduce into tank 341, metered quantities of a particular liquid which forms one of the ingredients to be mixed. Additional ingredients are introduced through additional supply tubes, such as tube 354a, which has a separate metering system feeding to it. The two liquids are progressively mixed in the mixing tank 340 and then discharged from a discharge tube 350, which is connected, via the fitting 250b to the tube 350a delivering liquid from tank 341 via tube 350a to tube 385 and tube 250b, shown in FIG. 5. The module 300 thus far described has at least one group of circumferentially spaced radially protruding pipes or ducts 315, the ends of which are provided respectively with 90° elbows 316, each of which supports a nozzle 320. The mixed liquid is delivered via ring 365 to nozzles 320 is supplied from the tank 341 via 350a to a distribution manifold ring 385 which circumscribes the central portion of the housing 311 in concentric fashion so as to feed inwardly to the nozzles 320, as illustrated in FIG. 4. Thus, liquid from the tank 341 is fed to the nozzles 320 and is also supplied to the nozzles 220, 220a, 220b and 220c, therebelow, via tube 250.

Above the horizontally disposed nozzles 320 are a plurality of relief valves 374, which discharge any excess contaminated air or gases in the stack, in the event that pressure is built above a prescribed limit. These nozzles 374 are carried by reducers 373 which are connected to pipes or ducts 372 the proximal ends of which communicate with the interior of the housing 311. These tubes 372 protrude respectively radially outwardly above the tubes or pipes 315. Thus, any excess stack gases or air will be discharged into the emerging stream or vortex of the fog being generated by the nozzles 320, respectively.

It will be observed in the broken away portion of FIG. 4 that the pipes, such as pipe 315, may be cut at an angle of about 45° so that the inner end portions of the pipe 315 act as a scoop to direct the stream of air outwardly.

It will be understood that a separate metering pump (not shown) similar to the metering pump 53 is required for each component of the treatment formulation which is mixed in the mixing tank 340. The metering pumps, such as pump 52 and its motor 53 are preferably LECO ASP-40 metering pumps which are capable of delivering from 0 to 60 fl. oz. per min. If necessary, a metering pump such as the LECO ASP-80, can be utilized which has a flow rate from 0 to 120 fl. oz. per min. Both pumps are supplied by Lowndes Engineering Company of Valdosta, Ga.

Usually the stack gases or air stream generated for passing into the housings 111, 211, and 311 should have a positive pressure from point 0.5 PSI to about 125 PSI. The amount of pressure within each stack should be determined by the number and requirements of the nozzles, such as nozzles 20, 120, 220, 320, etc., so as to provide an adequate amount of treatment liquids to the air streams. Any increase in capacity, which may be required simply entails the providing of additional modules to the stack. Since the nozzles 20 operate at a lower pressure than the relief valves, the relief valves will always discharge into a flow or vortex of treated air affluent from the adjacent nozzles. This flow will allow some treatment by residual chemicals contained within the liquid particles of fog from adjacent nozzles and will allow the venting air stream which passes through the relief valves to be further defused with countercurrent treatment air flow.

The liquid reservoirs which are provided at the top of the stacks such as tanks 41 and 341, provide an adequate flow to each of the nozzles 20, 120, 220, and 320, as the case may be. Each nozzle, however, usually has an individual needle valve for regulating the amount of liquid which will be fed to a prescribed amount of air.

In the operation of the embodiments described above, usually, from about 0.25 psia to about 10 psia air pressure in the duct or stack 7 is required in order to deliver the contaminated air to all of the nozzles 20. The nozzles 20 are preferable capable of delivering about 600 CFM optimum and between about 200 CFM and about 1,000 CFM. Usually, from about ½ gallon per hour to about 10 gallons per hour of treatment liquid is delivered to each of the nozzles, depending upon the particular liquid and contaminated air or gas which is mixed. When dust control is being carried out using water, about 10 gallons of water per hour is preferable supplied to each nozzle 20. Thus, from about 32 milliliters per minute to about 685 milliliters per minute of liquid is delivered to each nozzle. When 600 CFM of contaminated air is delivered by each nozzle, usually about 380 milliliters of fluid is employed.

The fog which is generated contains a mean particle size of between about 5 microns and about 50 microns, in the fog as delivered to the atmosphere. Where the system or apparatus of the present invention is for dust control, usually a particle size of about 50 microns is desirable.

In FIGS. 6 and 7 is illustrated a modified form of a nozzle which can be substituted for the nozzles 20, 20*a*, 120 and 320. In more detail, the nozzle 520 of this embodiment is fitted on the end of an air duct, such as duct 515. A sleeve 510 holds the nozzle 520 in place on duct 515. Sleeve 510 has an internal annular shoulder 511 which abuts the end of duct 515 when one end of sleeve 510 is received on the end of duct 515. Sleeve 510 is welded in place as by weld 508. The outer end of sleeve 510 receives an "O" ring 514, against shoulder 511 receives the proximal end of a nozzle housing 512 of the nozzle 520. The proximal end portions of nozzle 520 is provided with a peripheral groove which is circumferentially aligned with a pair of set screws or bolts 513 which are arranged at 90° circumferentially from each other and protrude through and are threadedly received in appropriate holes in the sleeve 510. The set screws 513 thus protrude into the circumferential groove of the housing 512 so as to lock nozzle 520 in place and prevent outward movement of the nozzle 520 and yet permit the nozzle 520 to be rotated, when screws 513 are loosened.

Housing 512 is generally cylindrical about axis $\gamma$ and has a cylindrical hollow interior from its inner or proximal end to its forward or distal end. Both ends of housing 512 are open, forming an air or gas passageway 507 through which contaminated air or gas from duct 515 passes. The distal end of housing 512 forms a discharge mouth 509 for the nozzle 520.

Intermediate its ends, the housing 512 is of increased external diameter and is provided with three circumferentially equally spaced, internally threaded. holes which respectively receive centering screws 516, screws 516 protruding through these holes and into the interior of the passage 507 of nozzle 520. Disposed along the longitudinal axis $\gamma$ is a central nozzle member 517, having a body 519 which has a central passageway 523. therethrough. The body 519 has a radially extending flat rear portion 519*a* and a frustoconical inwardly tapering front portion 518. The central passageway 523 is defined by three different, progressively smaller diameter walls and receives a core 530 having a flat rear surface which is in a common radial plane with the flat rear surface 519*a*.

The core 530 has a central passageway 531 defined by an initial cylindrical wall with a flaring, conically shaped, distal inner surface 522, thereby forming a venturi through which a primary portion of the contaminated air or gases, entering the central portion of nozzle 520, pass.

Bolts 516, which are circumferentially disposed at 120° from each other, are threadedly received by the housing 512 and protrude inwardly to form supports which center the nozzle member 517 concentrically with respect to the housing 512.

The outer peripheral surface of core 530 has an annular flange 530*a* forming a shoulder which arrests the inward movement of core 530 into the nozzle body 519 so that the intermediate portions of body 519 and core define, therebetween, an annular reservoir 521, surrounding the central portion of core 530. The annular reservoir 521, at its proximal end, communicates with a discharge annular orifice 535 formed between the distal end of core 530 and the wall, defining passageway 523.

A liquid feed pipe 534, which passes radially through the housing 512, is treadedly received in body 519 so that pipe 534 terminates in communication with reservoir 521. Liquid is supplied to feed pipe 534 by a supply tube such as tube 50*a*.

Surrounding the distal portion and central portions of housing 512, is an outer cylindrical jacket 525 which is welded by its proximal end to enlarge portions of the housing 512, thereby defining a tertiary annular passage 528 for air or gas. The distal end of jacket 525 terminates in an annular baffle 526 which extends inwardly over the distal end of housing 512, the baffle 526 being spaced from the end of housing 512 to provide an annular discharge opening 506, immediately in front of the distal end of housing 512. The annular passage 528 surrounding the main passage 507. Ports 529 in housing 512 communicates with the inner or proximal end of passage 528 and the central portion of passage 507.

The jacket 525, baffle 526, housing 512, nozzle member 517, sleeve 510 and duct 515 are concentric about axis γ.

In the operation of nozzle 520, the contaminated air or gases from duct 515 pass along axis γ into housing 512 from right to left in FIG. 6, and the liquid is delivered, under pressure, from pipe 534 to the reservoir 521. A portion of the contaminated air or gases or the central primary gas stream pass along axis γ through the central venturi of nozzle member 517 and progressively entrain the liquid, which passes out of the annular orifice 535. The remainder of the air or gases pass between the nozzle member 517 and the housing 512, and into the straight unobstructed portion of passage 507 as a secondary gas stream, the primary air stream being commingled, therewith, in the vicinity of distal or the discharge end of nozzle member 517. These commingled gas streams then pass out of the mouth 509 of passage 507. Any liquid droplets which are thrown to the inner surface of housing 512 are directed inwardly at mouth 509 by the tertiary gas stream originating from gas passing through ports 529, then along passage 528 to be directed inwardly toward axis γ to be mixed with the gases and liquid droplets in the commingled gases and any liquid dropping out of throat 509.

In the use of nozzle 20, 20a, 120, 320, and 520, it may be found desirable to employ noise abatement equipment to reduce the noise created by the passage of gases through the nozzles. This noise is a mixture of frequencies, many of them being in the high audio frequency range. To accomplish this abatement, it may be found desirable to install a noise blanker assembly containing a microphone 540 or other transducer installed in the housing 512, to pick up the noise signals and transfer them to a noise blanker 541 which shifts the audio noise frequencies by about 180° and transmits the same to a a loud speaker 542 mounted adjacent to one or several of the nozzles.

The apparatuses of the present invention are capable of using any of a large variety of deodorizers, neutralizers, disinfectants, scrubbers, scavengers and other fluids which are admixed with the emerging stack gases, exhaust fumes or air in the ducts or stacks. Utilizing the apparatuses of the present invention, air streams containing the toxic odorous gases are treated with appropriate chemicals, as the nozzles 20, 20a, 120, 220, 220a, 220b, 220c, thoroughly and progressively admix these appropriate chemicals usually in liquid form with the contaminated gases so as to produce a fog from each of the nozzles so that the chemicals are homogeneously mixed throughout the air or gas stream as it emerges.

The particle size of the liquid which is discharged along with the air is sufficiently small that the liquid can be maintained in the ambient air an appreciable length of time for the appropriate reactions to take place.

Various fluids can be utilized including masking agents which are products of dominant odors which cover the oxious or odorous gases with a more pleasant smell. The resulting aroma commonly displays hints of both odors. Such masking agents are usually oil based products and should be selected so as to be safe and effective.

Olfactory desensitizers can also admixed with the emerging gases. These products numb the nose as a method of odor neutralization. Odor desensitizers are used for low concentrations of hydrogen sulfide, mercaptans (methyl, ethyl and butyl), butyric acid, etc.

Air disinfectants, such as is commonly used in the home can be used as the fluid in the present invention. Such disinfectants are usually a combination of alcohol, chlorine or ammonia and non-functional fillers and fragrances. Such disinfectants have a definite function of both destroying some bacteria and also reducing or removing the odor from the emerging gases. Since the stacks are quite high up in the air, relatively toxic air disinfectants can be used without danger of high dosages to humans or farm or domestic animals.

Microbiological odor neutralizers can also be employed in the systems here disclosed. These microbiological compounds are used to breakdown odor-causing substances while they are in solution. The use of air borne microbes to remove odor within the air is not typically viable since the nutrients, that are needed to breakdown the compounds, are not readily available in the air. Most aerobic microbial reactions require phosphates, nitrates and oxygen. Compounds providing these radicals and element can be premixed with the microbiological in tank 340. The use of microbial products including packaged bacteria and liquid, freeze-dried products mixed with air (fluid) or bran solutions or the addition of enzymes to feed the normally present bacteria can be used as the fluid in the present invention to reduce or modify odors. Hydrogen sulfide, frequently a source of odor complaints, can be reduced to broken down by proper use of bioaugmentation, using the structure of the present invention.

Essences of oils can also be used in liquid form to deodorize in the present invention. Aerobic fragrances from living plants can be used in the present invention. In other words, odor modification chemicals can be admixed with the emerging odorous gases using the present apparatus and form less objectionable fragrances. In a loose bond, sometimes referred to as Van der Washs forces, the compounds cling together. The new substances do not have the same effect as either compound would, individually, on the olfactory senses. Products such as limonene and eucalyptus are fragrances which in liquid solution can be combined with the emerging gases utilizing the apparatus of the present invention.

Odor manipulators can also be used in liquid form in the present invention. One example of this is a solution containing jasmine in liquid to treat odorous skatole compounds in the contaminated air, thereby converging them into a pleasant smelling jasmine. This is accomplished by taking advantage of the carbon-hydrogen components contained within the jasmine scent and not in the skatole odor, the jasmine being carried in a liquid form and sprayed into the emerging gases containing the skatole.

Polymerized odor neutralizers can also be utilized in the structure of the present invention. This concept introduces large complex molecules carried by the liquid into the contaminated air to combine with the odorous compounds, tying them up. Sulfacted polyethylene amine, for example, can be carried in a liquid and will remove hydrogen sulfide. Such a procedure, however, should be used with caution since the sulfacted polyethylene amines are toxic and provides slippery surfaces. Many other polymers in solutions can also be used.

Odor neutralizers can be used in the present system. Such odor neutralizers are products that chemically change odor compounds by oxidation or reduction reactions. Most odor neutralizers are liquid and can be disbursed or diluted in other liquids and thus utilized with the present apparatus. Aqueous sodium hydroxide solution, aqueous potassium permanganate solution, chlorine bleach solution, ferrous sulfate solution, ferrous chloride solution, hydrogen peroxide solution, acidic acid solution, are a few of the most common odor neutralizers which can be used in the present invention. These compounds may be hazardous to use, however, they do typically have a disastrous affect on the microbes within the contaminated air.

Acidic acid is the least volatile of the odor neutralizers and can be utilized in the system of the present invention for odor control. The pH of this product and its reaction to concrete may be of concern. Gaseous ozone ($O_3$) can be used as a fluid in place of liquids. Ozone is useful both for odor control and as an antimicrobial when admixed with the contaminated air. Ozone, however, is another product that has its drawbacks since it corrodes metal and may cause respiratory problems for those exposed to the vapors. Ozone will react with a specific toxic chemical so as to neutralize the odor.

Odor absorbers are also capable of being used in the apparatus of the present invention.

Odor suppressants which reduce the overall level of odor to an unnoticeable or more tolerant level can be utilized in the present invention. These compounds are usually a combination of essence oils and fragrance compounds. The methods of combining a plurality of these oils throughout a solution rather than the specific compounds themselves are typically the subject of trade secret products. These products can be found as an emulsion or as a solution, either of which is capable of being used in the present invention. It is preferably, however, to use a true solution, rather than an emulsion. If an emulsion is used in the present invention, agitators (not shown) may be need in the main tank 50 and also in the accumulator tanks, such as tank 41 and 340 to keep the material in suspension.

When fragrance compounds are utilized, they should be highly disbursed in a liquid carrying agent. Sulfactants can be utilized in diluting the fragrances. The odor suppressants operate best when the particle size of the liquid is as fine as is reasonable. Indeed, water alone can be utilized in the present invention and will remove some odors or dust.

The liquid reservoirs created at the tops of the stacks by the tanks 40 and 340 will provide a sufficient head so that most liquids will flow by gravity to the nozzles 20, 20*a*, 320.

It will be obvious to those skilled in the art that many variations may be made in the embodiments here chosen for the purpose of illustrating the present invention with departing from the scope thereof as defined by the appended claims.

We claim:

1. An apparatus for admixing treatment fluids with contaminated gases, comprising:

(a) a main duct through which said gases pass, said main duct having a discharge end;

(b) a plenum chamber at said discharge end of said main duct, said plenum chamber having a hollow interior into which said gases travel;

(c) nozzle means communicating with said plenum chamber for substantially closing said plenum chamber, said nozzle means having passageway means through which said gases from said plenum chamber sweep at an increased velocity and then are progressively discharged into the atmosphere;

(d) a conduit through which said treatment fluid is directed into said nozzle means and thence into said passageway means for being progressively picked up and mixed with said gases as the gases sweep through said passageway means, the nozzle means producing a mixing of substantially all of said treatment fluid into said gases and progressively discharges the same from said nozzle means as finely divided droplets dispersed in said contaminated gases; and (e) means for affixing said plenum chamber to the end of said main duct for receiving said gases.

2. The apparatus defined in claim 1 wherein said nozzle is provided with a reservoir surrounding said passageway means and an annular orifice between said reservoir and said passageway means for directing said fluid inwardly through said orifice into said passageway means, for mixing with said contaminated air and for being discharged as a mixture from the end of said passageway means.

3. The apparatus defined-in claim 1 wherein said passageway means is a central passageway through which a portion of said gases pass, said nozzle means include a secondary passageway through which another portion of said gases pass, said secondary passageway directing said air inwardly for admixing with the gases and treatment fluid emerging from said passageway for thereby imparting a swirling action to said gases and treatment fluid as they emerge from said passageway means.

4. The apparatus defined in claim 1 wherein said fluid is a liquid, said apparatus including a pump for delivering said liquid to said conduit.

5. The apparatus defined in claim 1 including an accumulator tank mounted on said plenum chamber and wherein said conduit communicates with said accumulator tank for receiving said liquid from said accumulator tank and for delivering said liquid in a downward direction by gravity through said conduit and into said nozzle.

6. The apparatus defined in claim 1 wherein said nozzle means includes a plurality of nozzles disposed in circumferential spaced relationship around said plenum chamber for directing said mixture radially away from said plenum chamber in a plurality of circumferentially spaced directions.

7. An apparatus for admixing treatment liquid with stack gases, comprising:

(a) an upstanding stack through which stack gases are passed toward its upper end for being discharged into the atmosphere;

(b) a housing disposed over said upper end of said stack for providing a plenum chamber for receiving said stack gases;

(c) a plurality of nozzles disposed in spaced relationship around said housing, said nozzles being adapted to admix air and a liquid;

(d) ducts supported in generally cantilever fashion by said plenum chamber for communicating with said plenums chamber and respectively communicating with said nozzles for simultaneously delivering said stack gases to said nozzles so that said stack gases are directed through said nozzles and are discharged into the atmosphere;

(e) conduits respectively connected to said nozzles;
(f) a source of liquid; and
(g) means for delivering said liquid to said conduits and thence to said stack gases passing through said nozzles for being uniformly mixed, as the stack gases and liquid emerge from said nozzle.

8. The apparatus defined in claim 7 wherein said nozzles are fog generators which generate fog from said liquid and gases as said liquid and gases emerge.

9. The apparatus defined in claim 7 wherein said ducts have passages and said nozzles each has a central passageway substantially smaller than the passage of the duct and through which said gases are directed outward along an axis, each of said nozzles directing the liquid inwardly toward said axis of said central passage for progressively admixing with said stack gases said passageway and wherein said nozzles are disposed circumferentially around said housing so as to direct said gases outwardly from said housing in a plurality of directions.

10. The apparatus defined in claim 7 including an accumulator tank mounted on said housing, said pump delivering liquid to said accumulator tank and said conduits delivering liquid from said accumulator tank to said nozzles, said nozzles being disposed below said accumulator tank.

11. An apparatus for treating contaminated gases emerging from a stack with a treatment liquid comprising:
(a) a plenum chamber for receiving said contaminated gases under pressure from said stack;
(b) a duct having a proximal end communicating with said plenum chamber and a distal end;
(c) a nozzle extending across substantially the entire said distal end and communicating with said duct, said nozzle being of the type capable of progressively admixing small quantities of liquid with said gases;
(d) a source of treatment liquid capable of treating said contaminated gases; and
(e) delivery means for delivering said treatment liquid to said nozzle whereby said nozzle causes said gases and said liquid to be progressively admixed for discharging from said nozzle as a stream of fog.

12. The apparatus defined in claim 11 wherein gases in said plenum chamber have a pressure of from about 0.5 psia to about 125 psia.

13. The apparatus defined in claim 11 including additional ducts communicating with said plenum chamber, additional nozzles respectively connected to said additional ducts, and additional conduits communicating with said delivery means and respectively to said additional nozzles, said additional nozzles being spaced from each other and from said nozzle for respectively individually mixing separate portions of said gases and liquid and for respectively discharging the mixed liquid and gases from said additional nozzles as individual additional streams of fog.

14. The apparatus defined in claim 13 wherein each of said nozzles and said nozzle respective admix from approximately 32 milliliters per minute to approximately 685 milliliters per minute of liquid with said gases passing through that nozzle.

15. The apparatus defined in claim 13 wherein said ducts and said nozzles are spaced radially around said plenum chamber.

16. The apparatus defined in claim 15 including relief valves adjacent to said nozzles for discharging gases from said plenum chamber directly into said streams of fog.

17. A method for applying treatment fluid to a contaminated air stream for changing the condition of the contaminates in the air stream comprising:
(a) progressively passing said contaminated air stream under pressure along a prescribed path;
(b) separating said air stream into a plurality of separate individual contaminated air streams;
(c) increasing the velocity of said individual contaminated air streams by passing said individual contaminated air streams through individual passageways;
(d) progressively introducing into said individual air streams, minute quantities of said treatment fluid for producing separate admixtures of fluid and gases; and
(e) directing the separate-admixtures of fluid and gases into the atmosphere along individual paths.

18. The method defined in claim 17 in which said treatment fluid is a liquid.

19. The method defined in claim 17 in which step (d) includes directing said fluid generally radially inwardly into said individual passageways as said individual air streams pass along respective passageways.

20. The method defined in claim 17 wherein said separate admixtures are respectively discharged as individual fog streams.

21. The method defined in claim 17 wherein said liquid is reacted with said contaminates after said liquid and contaminated gas are admixed.

22. The method defined in claim 17 wherein said treatment liquid is water and said contaminate is dust.

23. The method defined in claim 17 wherein said liquid is selected from the group consisting of odor manipulators, odor neutralizers, marking agents, olfactory Desensitizers, air disinfectants, essence of oil, odor absorbers and order suppressants.

24. The method defined in claim 17 including imparting a swirling motion to each of said admixtures as it emerges from its individual path into the atmosphere.

25. The method defined in claim 24 wherein the step of imparting a swirling motion to said air streams includes respectively subdividing said individual air streams into a plurality of subdivided air streams prior to step (d), passing one subdivided portion of said air stream along a path in which step (d) is performed on one subdivided portion, passing the other subdivided portion along a separate path and directing said other portion toward said one portion for commingling with said admixture and for imparting the swirling motion to the commingled admixture.

* * * * *